Feb. 9, 1954     T. GALLARDO     2,668,387
BAIT RETAINING FISHHOOK
Filed Jan. 10, 1950
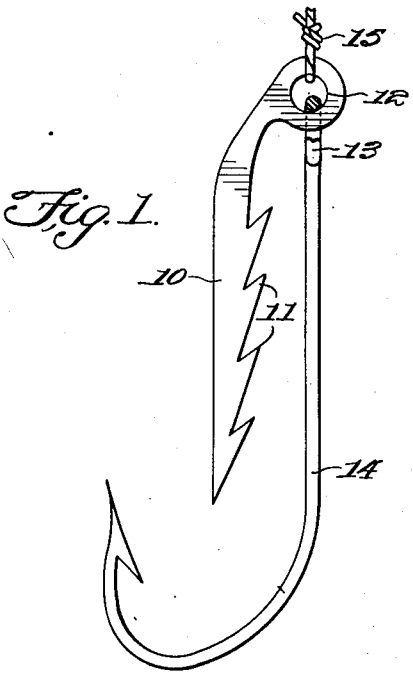
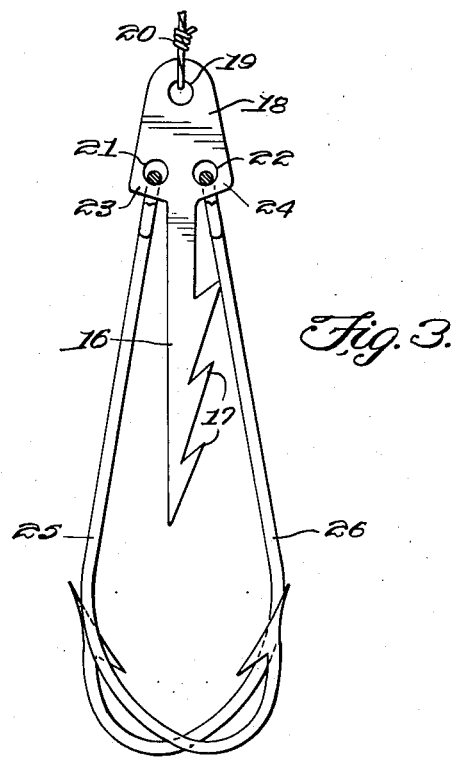
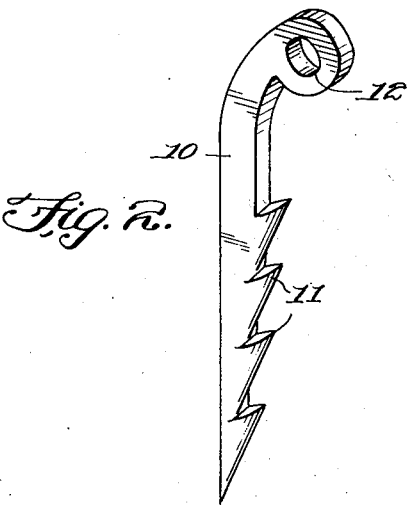
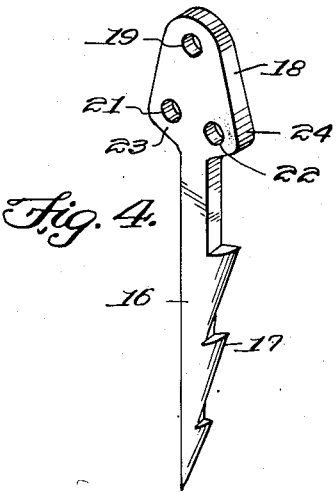
INVENTOR.
Tomas Gallardo,
BY Victor J. Evans & Co.
ATTORNEYS Patented Feb. 9, 1954

2,668,387

UNITED STATES PATENT OFFICE 2,668,387

BAIT RETAINING FISHHOOK

Tomas Gallardo, New Orleans, La.

Application January 10, 1950, Serial No. 137,793

2 Claims. (Cl. 43—44.4)

This invention relates to devices for holding bait centered or in position on a fish hook, and in particular a support suspended from the eye of a hook having a plurality of barbs thereon with the barbs positioned to grip bait on the hook.

The purpose of this invention is to provide means for retaining bait on fish hooks which also holds the bait in position on the center of the hook.

Various devices have been used for holding bait to fish hooks but where bait is held by tying or spring clips it is difficult to hold the bait in position and apply the holding means at the same time. With this thought in mind this invention contemplates a support or arm with barbs thereon which, after the bait is positioned on the hook, is dropped into gripping relation with the bait whereby the bait is retained in position on the hook.

The object of this invention is, therefore, to provide means in combination with a fish hook which automatically grips bait placed on a hook and which is always in operative position on the hook.

Another object of the invention is to provide means for retaining bait on fish hooks that may readily be applied to hooks now in use.

A further object of the invention is to provide a bait gripping device for fish hook which is of a simple and economical construction.

With these and other objects and advantages in view the invention embodies an arm having barbs in one side with an eye at the upper end wherein the eye is positioned through the eye of a fish hook and a fishing line is attached thereto.

Other features and advantages of the invention will appear from the following description taken in connection with the drawings wherein:

Figure 1 is a side elevational view showing the bait retainer mounted on a fish hook.

Figure 2 is a detail illustrating a bait retainer for fish hooks in which the retainer is provided with a single eye at the upper end.

Figure 3 is a view illustrating a modification wherein the bait retainer is provided with a base for supporting a plurality of fish hooks.

Figure 4 is a detail illustrating the bait retainer shown in Figure 3.

Referring now to the drawings wherein like reference characters denote corresponding parts the fish hook bait retainer of this invention includes an arm 10 having barbs 11 in one side and an eye 12 at the upper end.

With the parts arranged in this manner an eye 13 of a fish hook 14 is positioned in the eye 12 of the bait retainer and a fishing line 15 is also attached to the eye 12 of the bait retainer.

With the parts arranged in this manner a large worm or other bait positioned over the fish hook is gripped by the barbs 11 of the retainer 10 whereby the bait is positively held in position on the hook.

In the design shown in Figure 3 a fish bait retainer 16 is provided with barbs 17 on one side and a substantially triangular shaped base 18 is provided at the upper end. The base 18 is formed with an opening 19 for a fishing line, as indicated by the numeral 20, and openings 21 and 22, which are positioned in shoulders 23 and 24 thereof, respectively for fish hooks 25 and 26.

With the parts arranged as illustrated in Figure 3 bait positioned on the fish hooks is positively gripped and held by the barbs 17 of the retainer 16 and when a fish strikes the hooks are forced together forcing the points of the hooks into the walls of the mouth of jaws of the fish. By this means a fish is positively caught on the hook.

In the design illustrated in Figures 2 and 4 the barbs 11 and 17 are shown with arcuate outer surfaces and it will be understood that barbs of any type or design may be used on the bait retaining arms of the hooks.

It will be understood that other modifications may be made in the design and arrangement of the parts without departing from the spirit of the invention.

What is claimed is:

1. A fish hook bait retainer comprising a base which is substantially triangular shaped and having an arm extended from the lower end thereof with the base and arm lying in one plane said base having a line attaching opening in the upper apex end with its axis positioned in a plane normal to the one plane and extended through the arm and having hook attaching openings positioned on opposite sides of the plane in which the line attaching opening is positioned, said arm having barbs thereon.

2. A fish hook bait retainer comprising a base which is substantially triangular shaped and having an arm extended from the lower end thereof with the base and arm lying in the one plane, said base having a line attaching opening in the upper end thereof and having its axis positioned in a plane normal to the one plane and plane extended through the arm and having hook attaching openings positioned on opposite sides of the plane in which the line attaching opening is positioned, said arm having barbs thereon, and hooks having eyes positioned with the eyes thereof extended through the hook attaching openings through the base of the bait retainer with the hooks extended downwardly on opposite sides of the arm of the retainer and with the points of the hooks extended inwardly through the latter plane.

TOMAS GALLARDO.

References Cited in the file of this patent

UNITED STATES PATENTS

| Number | Name | Date |
|---|---|---|
| 531,140 | Stapp | Dec. 18, 1894 |
| 666,309 | Fiege | Jan. 22, 1901 |
| 1,875,182 | Southwell | Aug. 30, 1932 |
| 2,319,246 | Martin | May 18, 1943 |
| 2,499,145 | Jensen | Feb. 28, 1950 |
| 2,565,956 | Duhamel | Aug. 28, 1951 |

FOREIGN PATENTS

| Number | Country | Date |
|---|---|---|
| 51,227 | Sweden | Mar. 15, 1922 |
| 591,198 | Great Britain | Aug. 11, 1947 |